(12) United States Patent
Dachiku (10) Patent No.: US 8,495,468 B2
(45) Date of Patent: Jul. 23, 2013

(54) DATA STORAGE APPARATUS AND DATA WRITING/READING METHOD

(75) Inventor: Kenshi Dachiku, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 13/014,938

(22) Filed: Jan. 27, 2011

(65) Prior Publication Data

US 2011/0231737 A1 Sep. 22, 2011

(30) Foreign Application Priority Data

Mar. 16, 2010 (JP) ................. 2010-059814

(51) Int. Cl.
*G11C 29/00* (2006.01)

(52) U.S. Cl.
USPC .................. 714/770; 714/782; 714/767

(58) Field of Classification Search
USPC ............... 714/770, 782, 784, 781, 769, 42
See application file for complete search history.

(56) References Cited

U.S. PATENT DOCUMENTS

| | | | | |
|---|---|---|---|---|
| 5,960,169 A | * | 9/1999 | Styczinski | 714/6.12 |
| 6,070,182 A | * | 5/2000 | Rao et al. | 708/708 |
| 6,148,368 A | * | 11/2000 | DeKoning | 711/113 |
| 6,167,087 A | * | 12/2000 | Kato | 375/240.03 |
| 6,230,240 B1 | * | 5/2001 | Shrader et al. | 711/114 |
| 6,243,827 B1 | * | 6/2001 | Renner, Jr. | 714/6.12 |

FOREIGN PATENT DOCUMENTS

| | | |
|---|---|---|
| JP | 10-240453 | 9/1998 |
| JP | 11-096081 | 4/1999 |
| JP | 2004-030577 | 1/2004 |
| JP | 2008-033412 | 2/2008 |
| JP | 2008-102819 | 5/2008 |

OTHER PUBLICATIONS

Office Action mailed Nov. 15, 2011 regarding corresponding Japanese Application No. 2010-059814, including Translation (5 pgs.).

* cited by examiner

*Primary Examiner* — Fritz Alphonse
(74) *Attorney, Agent, or Firm* — Finnegan, Henderson, Farabow, Garrett & Dunner, LLP (57) ABSTRACT

According to one embodiment, a data storage apparatus including memory chips includes an error correction encoder, a RAID controller, error detectors and memory units. Each of the memory chips includes a semiconductor memory. The error correction encoder adds an error correction code to an encoded data stream. The RAID controller divides the encoded data stream from the error correction encoder into data blocks. The RAID controller generates a parity data block based on the data blocks. The RAID controller outputs the data blocks and parity data block to the error detectors, respectively. The error detectors add an error detection code to the data blocks and parity data block output from the RAID controller. Each of the memory units includes the memory chips. The memory units write the data blocks and parity data block from the error detectors to the memory chips.

13 Claims, 8 Drawing Sheets

DATA STORAGE APPARATUS AND DATA WRITING/READING METHOD

CROSS-REFERENCE TO RELATED APPLICATIONS

This application is based upon and claims the benefit of priority from Japanese Patent Application No. 2010-059814, filed Mar. 16, 2010; the entire contents of which are incorporated herein by reference.

FIELD

Embodiments described herein relate generally to a data storage apparatus and a data writing/reading method.

BACKGROUND

In recent years, a Redundant Arrays of Inexpensive Disks (RAID) mechanism has frequently been adopted in a data storage apparatus for storing video data to improve reliability and availability of contained memory units and realize faster access (for example, see Jpn. Pat. Appln. KOKAI Publication No. 11-96081). Various RAID levels are available. RAID 5 is widely adopted for its excellent balance of reliability/availability and economic efficiency. RAID 5 distributes parity information to memory units. RAID 5 can compensate data upon failure of one memory unit, realize faster reading at normal condition by striping, and provide economic efficiency because only one memory unit is additionally required.

In recent years, a semiconductor memory, such as a flush memory, has been frequently used as a memory unit of a data storage apparatus because the semiconductor memory comprises no moving part and has high reliability. This type of memory unit comprises a plurality of memory chips, each of which includes semiconductor memories, and is configured to store data in the memory chips. However, in a memory unit comprising a plurality of memory chips, a memory chip may be damaged because of, for example, writing operations performed to excess.

DETAILED DESCRIPTION

In general, according to one embodiment, a data storage apparatus including memory chips which enable data write in units of one page includes an error correction encoder, a RAID controller, a plurality of error detectors and a plurality of memory units. Each of the memory chips includes a semiconductor memory. The error correction encoder adds an error correction code to an encoded data stream. The RAID controller includes a plurality of connection interfaces. The RAID controller divides the encoded data stream output from the error correction encoder into data blocks each of which corresponds to the page. The RAID controller generates a parity data block based on the data blocks. The RAID controller outputs the data blocks and parity data block to the connection interfaces, respectively. The plurality of error detectors connect to the connection interfaces, respectively. The error detectors add an error detection code to the data blocks and parity data block output from the connection interfaces. The plurality of memory units connect to the error detectors, respectively. Each of the memory units includes the memory chips. The memory units write the data blocks and parity data block output from the error detectors to the memory chips in units of the page.

First Embodiment

Referring to the drawings, an embodiment of a data storage apparatus will be described in detail.

Figure 1:
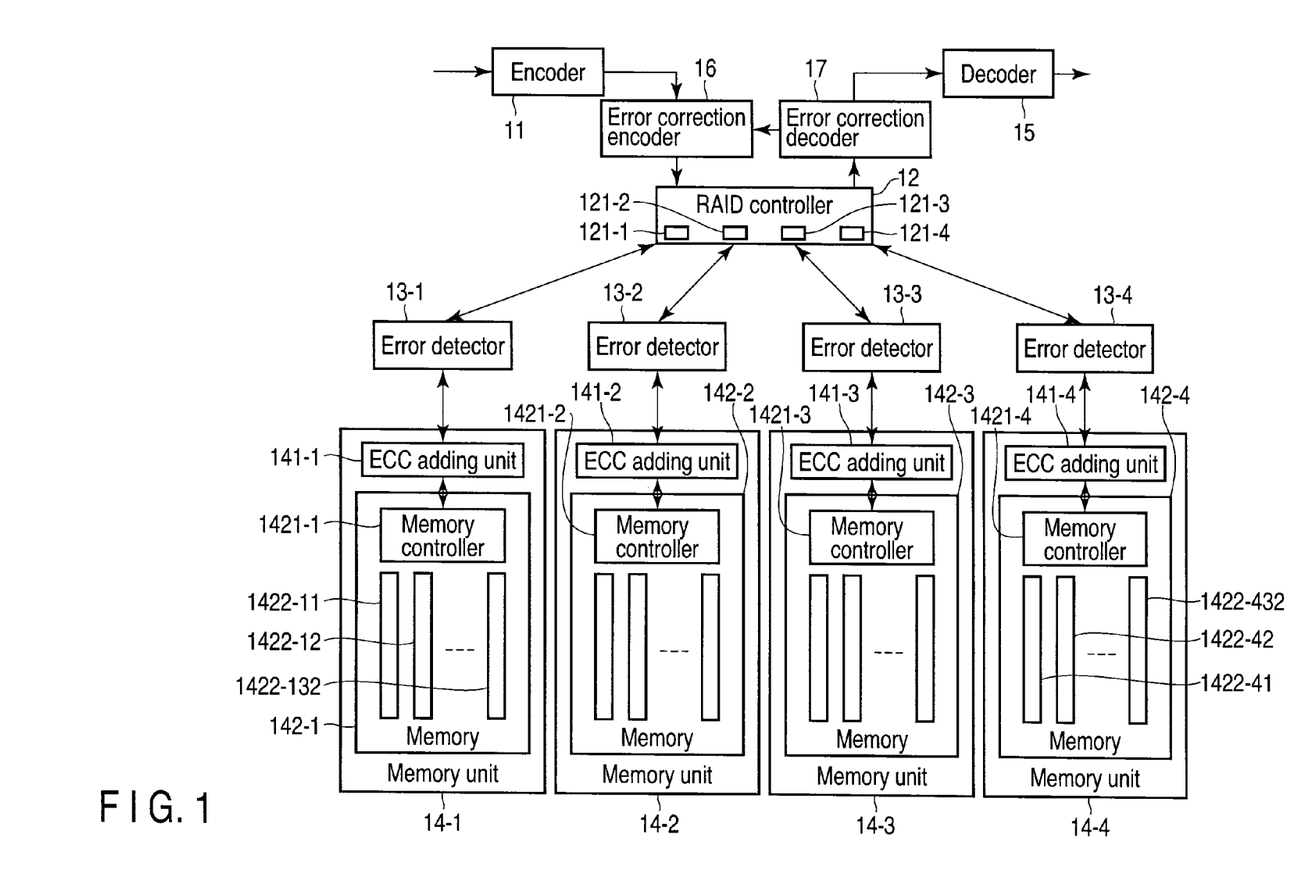
FIG. 1 is a block diagram showing a functional configuration of a data storage apparatus according to a first embodiment.

FIG. 1 is a block diagram showing a functional configuration of the data storage apparatus according to the first embodiment. The data storage apparatus in FIG. 1 comprises an encoder 11, a Redundant Arrays of Independent Disks (RAID) controller 12, error detectors 13-1 to 13-4, memory units 14-1 to 14-4, a decoder 15, an error correction encoder 16, and an error correction decoder 17. The data storage apparatus has a configuration according to RAID 5.

The encoder 11 is connected to the error correction encoder 16.

The decoder 15 is connected to the error correction decoder 17.

The RAID controller 12 is connected to the error correction encoder 16 and the error correction decoder 17. The RAID controller 12 comprises connection interfaces 121-1 to 121-4, and is connected to the error detectors 13-1 to 13-4 via the connection interfaces 121-1 to 121-4. The error detectors 13-1 to 13-4 are connected to the memory units 14-1 to 14-4.

The encoder 11 acquires an image data stream from, for example, a camera, and encodes the image data stream by a predetermined encoding method. The encoder 11 outputs an encoded data stream to the error correction encoder 16.

The error correction encoder 16 encodes the encoded data stream output from the encoder 11 with an error correction code capable of correcting a burst error. For example, a Reed-Solomon correction code is used as the error correction code capable of correcting a burst error. The error correction encoder 16 outputs an encoded data stream subjected to error correction encoding to the RAID controller 12.

When image data is stored, the RAID controller 12 divides the encoded data stream into units of a writable page, thereby generating three data blocks. The RAID controller 12 generates a parity data block corresponding to one writable page.

The capacity of one page, which is a writable unit, is determined depending on the memory chips. More specifically, the data size of one page is determined based on the product of a page size of a memory chip multiplied by the number of chips to which data is written in parallel. A parity data block is generated so that the three data blocks and the parity data block have no "1" or even-numbered "1" in total. The RAID controller 12 outputs the data blocks to three of the connection interfaces 121-1 to 121-4, and outputs the parity data block to the remaining one of the connection interface 121-1 to 121-4. The RAID controller 12 sequentially switches the connection interface to which the parity data block is output, allowing the other connection interfaces to receive the data blocks.

When image data is reproduced, the RAID controller 12 receives data blocks and a parity data block from the error detectors 13-1 to 13-4 via the connection interfaces 121-1 to 121-4. When an error occurs in one of the data blocks, the RAID controller 12 restores the data block including an error based on the normal data blocks and the parity data block. The RAID controller 12 synthesizes the restored data block and the normal data blocks to generate an encoded data stream, and outputs it to the error correction decoder 17. On the other hand, when no error occurs, the RAID controller 12 synthesizes the data blocks output from the three error detectors of the error detectors 13-1 to 13-4 to generate an encoded data stream. The RAID controller 12 outputs the encoded data stream to the error correction decoder 17.

The error correction decoder 17 performs error correction decoding on the encoded data stream output from the RAID controller 12 based on an error correction code used at the error correction encoder 16. The error correction decoder 17 outputs the encoded data stream subjected to error correction decoding to the decoder 15.

The decoder 15 decodes the encoded data stream output from the error correction decoder 17 by a decoding method corresponding to the encoding method of the encoder 11. The decoder 15 outputs decoded data to the outside.

When image data is recorded, the error detector 13-1 adds an error detection code, such as a checksum, to a data block or parity data block output from the RAID controller 12. The error detector 13-1 outputs the data block or parity data block to which the error detection code has been added to the memory unit 14-1.

When image data is reproduced, the error detector 13-1 determines whether a data block or parity data block output from the memory unit 14-1 includes an error based on the error detection code. When the error detector 13-1 detects an error in the data block or parity data block, the error detector 13-1 outputs a detection signal to the RAID controller 12. The processing in error detectors 13-2 to 13-4 is the same as that of error detector 13-1.

The memory units 14-1 to 14-4 respectively comprise ECC adding units 141-1 to 141-4 and memories 142-1 to 142-4. The memories 142-1 to 142-4 respectively comprise memory controllers 1421-1 to 1421-4, and memory chips 1422-11 to 1422-132, ..., 1422-41 to 1422-432, each of which includes semiconductor memories such as a flush memory. In the present embodiment, 32 memory chips are used. However, the number of memory chips is not limited to 32.

When image data is recorded, the memory units 14-1 to 14-4 store the data blocks and parity data block output from the error detectors 13-1 to 13-4. The same processing is performed in the memory units 14-1 to 14-4, and processing in memory unit 14-1 will be representatively described below.

The ECC adding unit 141-1 adds an ECC, which is a bit error correction code, to the data block or the parity data block output from the error detector 13-1. The data block or parity data block to which the ECC has been added is output to the memory 142-1.

In the memory 142-1, when the memory controller 1421-1 receives the data block or parity data block from the ECC adding unit 141-1, the memory controller 1421-1 writes the data block or parity data block to the memory chips 1422-11 to 1422-132 in units of pages.

When image data is reproduced, the memory units 14-1 to 14-4 read the recorded data blocks and parity data block, and output them to the error detectors 13-1 to 13-4. The same processing is performed in the memory units 14-1 to 14-4, and processing in memory unit 14-1 will be representatively described below.

The memory controller 1421-1 reads the data block or parity data block stored in the memory chips 1422-11 to 1422-132, and outputs it to the ECC adding unit 141-1.

The ECC adding unit 141-1 corrects a read error in the data block or parity data block output from the memory 142-1 based on the ECC. The ECC adding unit 141-1 outputs the data block or parity data block of which read error has been corrected to the error detector 13-1.

Next, operations of the data storage apparatus with the above-described configuration will be described in detail.

Figure 2:
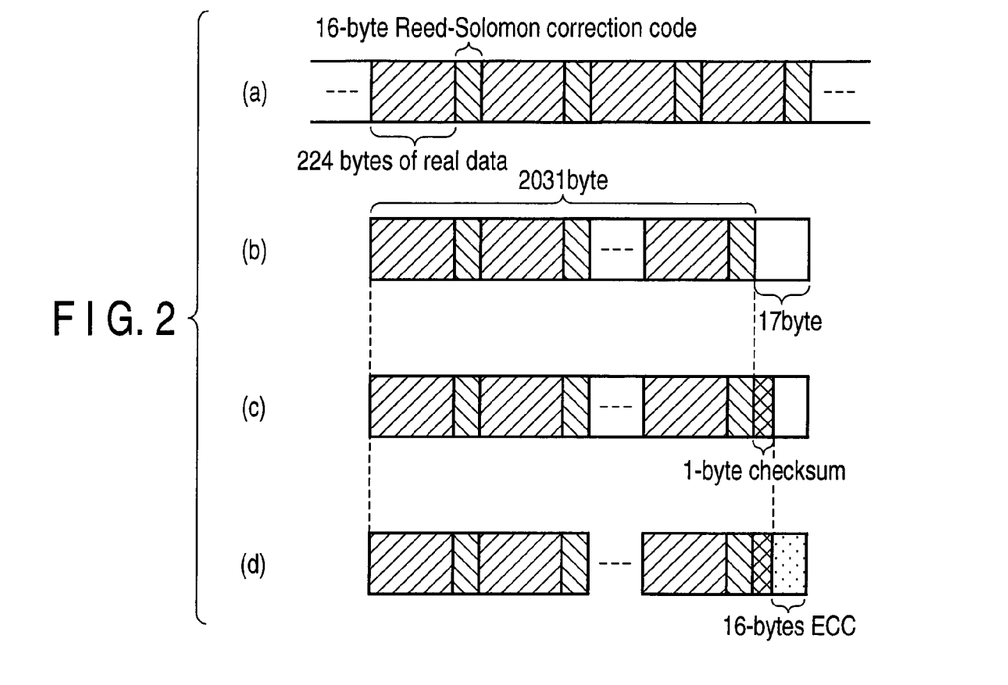
FIG. 2 shows processing performed on data blocks in the data storage apparatus of FIG. 1.
Figure 3:
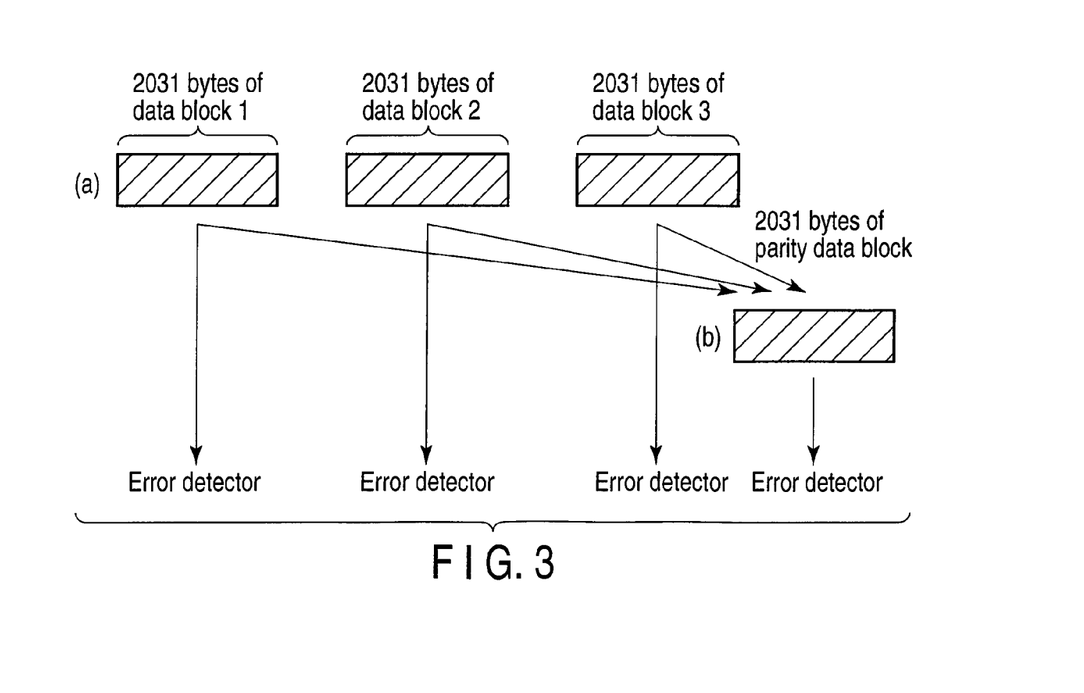
FIG. 3 shows processing performed on a parity data block in the data storage apparatus of FIG. 1.

FIG. 2 is a schematic diagram showing processing performed when the data storage apparatus according to the first embodiment records a data block or a parity data block. FIG. 3 is a schematic diagram showing processing performed when the RAID controller 12 of the data storage apparatus according to the first embodiment generates a parity data block. In the present embodiment, the capacity of one page is 2048 bytes as shown in FIGS. 2 and 3, but the capacity of one page is not limited to 2048 bytes.

When image data is recoded, the error correction encoder 16 adds a 16-byte Reed-Solomon correction code to the encoded data stream output from the encoder 11 for each 224-byte real data item, and outputs the encoded data stream shown in FIG. 2 (a) to the RAID controller 12. Addition of the 16-byte Reed-Solomon correction code enables correction of an error of up to 8 bytes.

When image data is reproduced, the error correction encoder 17 receives the encoded data stream shown in FIG. 2 (a) from the RAID controller 12, and corrects an error in real data using the Reed-Solomon correction code.

When image data is recorded, the RAID controller 12 divides the encoded data stream output from the error correction encoder 16 into units of 6093 bytes, and divides each unit into three data blocks comprising 2031 bytes. FIG. 2 (b) shows one of the data blocks. At this moment, the data block is 17 bytes less than the capacity of one page, i.e., 2048 bytes. The RAID controller 12 outputs the data block shown in FIG. 2 (b) to each of three error detectors of the error detectors 13-1 to 13-4.

The RAID controller 12 divides the encoded data stream output from the error correction encoder 16 into data blocks shown in FIG. 3 (a), and generates a 2031-byte parity data block shown in FIG. 3 (b). At this moment, the parity data block is 17 bytes less than the capacity of one page, i.e., 2048 bytes. The RAID controller 12 outputs the parity data block shown in FIG. 3 (b) to one error detector of the error detectors 13-1 to 13-4.

When image data is reproduced, the RAID controller 12 receives the data block shown in FIG. 2 (b) from each of three error detectors of the error detectors 13-1 to 13-4. The RAID controller 12 also receives the parity data block shown in FIG. 3 (b) from one error detector of the error detectors 13-1 to 13-4.

When the RAID controller 12 receives a detection signal from one of the error detectors 13-1 to 13-4, the RAID controller 12 determines that an error has occurred in the data block or parity data block supplied from the error detector which has generated the detection signal. If the RAID controller 12 determines that one of the data blocks includes an error, the RAID controller 12 restores the data block including an error based on the remaining data blocks and the parity data block. The RAID controller 12 synthesizes the restored data block and the other data blocks to generate the encoded data stream shown in FIG. 2 (*a*). If no data block includes an error, the RAID controller 12 synthesizes the data blocks from three of the error detectors 13-1 to 13-4 to generate the encoded data stream shown in FIG. 2 (*a*). The RAID controller 12 outputs the encoded data stream to the error correction decoder 17.

When image data is recorded, the error detector 13-1 adds a one-byte checksum to the data block or parity data block output from the RAID controller 12 as shown in FIG. 2 (*c*). The error detector 13-1 outputs the data block or parity data block shown in FIG. 2 (*c*) to the memory unit 14-1.

When image data is reproduced, the error detector 13-1 receives the data block or parity data block shown in FIG. 2 (*c*) from the memory unit 14-1. The error detector 13-1 refers to the checksum, and determines whether or not an error has occurred in the data block or parity data block. If the error detector 13-1 determines that an error has occurred in the data block or parity data block, the error detector 13-1 generates a detection signal and outputs it to the RAID controller 12. The error detector 13-1 outputs the data block or parity data block shown in FIG. 2 (*b*) to the RAID controller 12.

When image data is recorded, the ECC adding unit 141-1 adds a 16-byte ECC to the data block or parity data block output from the error detector 13-1 after the checksum, as shown in FIG. 2 (*d*). The ECC adding unit 141-1 outputs the data block or parity data block shown in FIG. 2 (*d*) to the memory 142-1. Accordingly, the capacity of 2048 bytes is fully occupied. The data block or parity data block to which the ECC has been added is written to the memory chips 1422-11 to 1422-132 by the memory controller 1421-1.

When image data is reproduced, the ECC adding unit 141-1 receives the data block or parity data block shown in FIG. 2 (*d*) from the memory 142-1. The ECC adding unit 141-1 corrects real data of the data block or parity data block using the ECC. The ECC adding unit 141-1 outputs the data block or parity data block shown in FIG. 2 (*c*) to the error detector 13-1.

Figure 4:
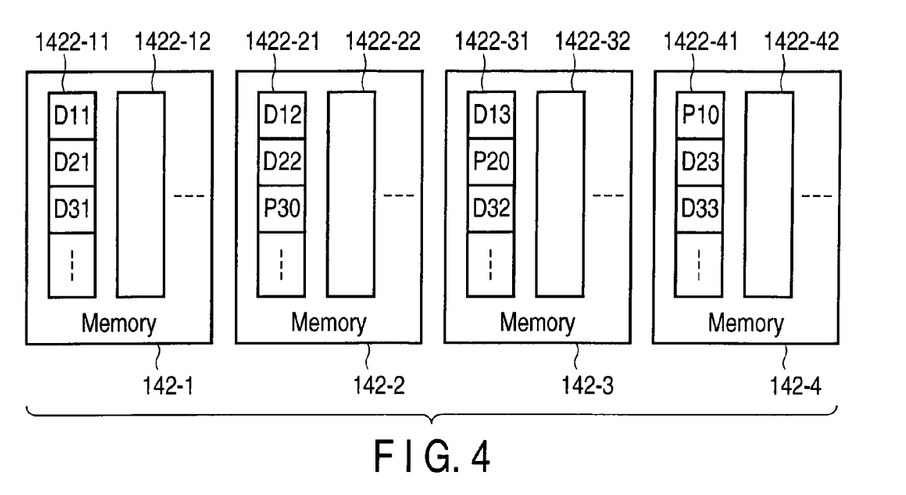
FIG. 4 shows an example of storage of the data blocks and parity data block in memories shown in FIG. 1.

FIG. 4 shows a schematic diagram of the data blocks and parity data block recorded in the memories 142-1 to 142-4 by the above-described processing. In FIG. 4, D11, D12, D13, . . . represent data blocks, and P10, P20, P30, . . . represent parity data blocks. The data block and parity data block are written in units of one page, which is a writable unit of the memory chips. The memory unit in which the parity data block is recorded is switched by the RAID controller 12 for each page.

Figure 5:
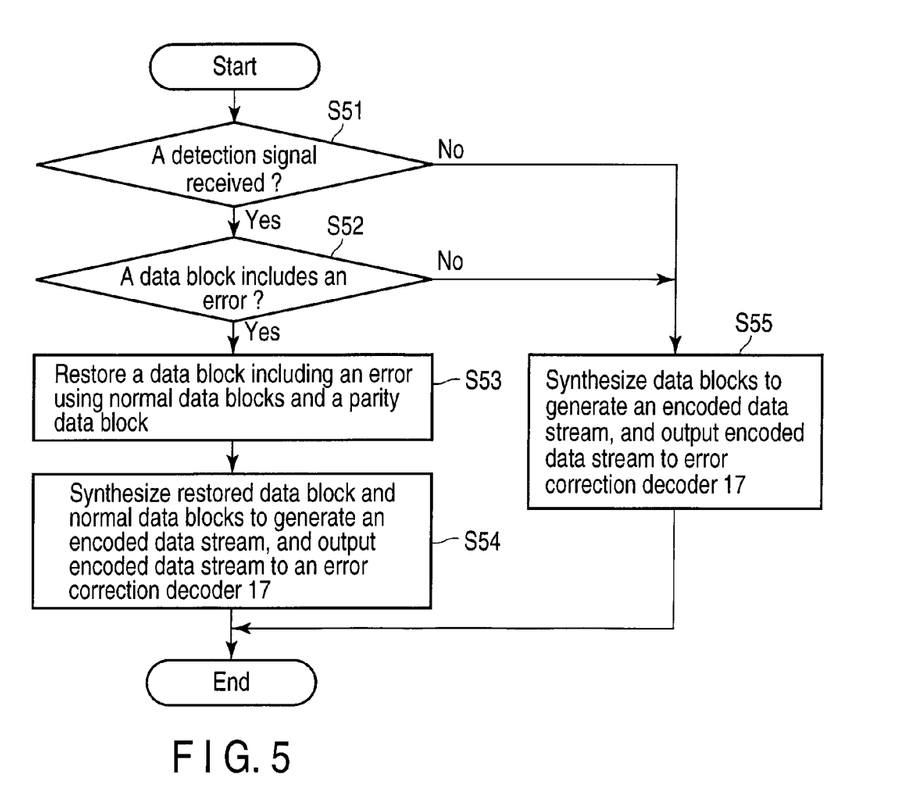
FIG. 5 is a flowchart showing how a RAID controller shown in FIG. 1 restores data.

FIG. 5 is a flowchart showing how the RRID controller 12 restores data in the data storage apparatus according to the first embodiment.

The RAID controller 12 determines whether a detection signal has been transmitted from any error detector of the error detectors 13-1 to 13-4 (step S51). If the RAID controller 12 receives a detection signal (Yes in step S51), the RAID controller 12 determines that the data block or parity data block output from an error detector which has transmitted the detection signal includes an error. The RAID controller 12 determines whether or not a data block includes the error (step S52). When a data block includes the error (Yes in step S52), the RAID controller 12 restores the data block including the error based on normal two data blocks and a parity data block (step S53). The RAID controller 12 synthesizes the restored data block and the normal two data blocks to generate an encoded data stream, and outputs the encoded data stream to the error correction decoder 17 (step S54).

When the detection signal is not received in step S51 (No in step S51), the RAID controller 12 synthesizes three data blocks to generate an encoded data stream, and outputs the encoded data stream to the error correction decoder 17 (step S55).

When the RAID controller 12 determines that no data block includes an error in step S52 (No in step S52), the RAID controller 12 moves the processing to step S55.

As described above, in the first embodiment, when image data is recorded, the data storage apparatus adds an error correction code, such as a Reed-Solomon correction code, to an encoded data stream output from the encoder 11 by means of the error correction encoder 16, generates a parity data block by means of the RAID controller 12, adds an ECC to data blocks and a parity data block output from the error detectors 13-1 to 13-4 by means of the ECC adding units 141-1 to 141-4. When image data is reproduced, the data storage apparatus corrects a bit error in the data blocks and parity data block output from the memories 142-1 to 142-4 by means of the ECC adding units 141-1 to 141-4, restores a data block including an error by means of the RAID controller 12, and corrects a burst error in an encoded data stream output from the RAID controller 12 by means of the error correction decoder 17. Accordingly, when image data is recorded/reproduced, the data storage apparatus performs triple error prevention processes.

In conventional data storage apparatuses, a bit error occurring when data is written/read is corrected by means of an ECC adding unit, and in the case of breakage of the entire memory chip, such as memory chip failure, data is restored using a parity data block by means of a RAID controller. However, when memory chip failure occurs in a plurality of memory units, conventional data storage apparatuses cannot restore data to its original state even if the ECC adding unit and RAID controller are used.

In contrast, the data storage apparatus according to the present embodiment comprises the error correction encoder 16 and the error correction decoder 17 in addition to the ECC adding units 141-1 to 141-4 and RAID controller 12. By using the error correction decoder 17, the data storage apparatus can further perform error correction on the encoded data stream output from the RAID controller 12. Even when memory chip failure occurs in a plurality of memory units, and the RAID controller 12 cannot correctly restore a data block, the error can be corrected by the error correction decoder 17. Namely, even when memory chip failure occurs in a plurality of memory units, normal image data can be reproduced.

Generally, when a memory unit fails, the failed memory unit is replaced with a new memory unit. In this case, the RAID controller restores data recorded in the failed memory unit based on data recorded in the other normal memory units. The RAID controller writes restored data to the replacement memory unit, thereby reconstructing data recorded in the failed memory unit. When memory chip failure occurs in a plurality of memory units, conventional data storage apparatuses cannot properly restore data. Therefore, conventional data storage apparatuses have a problem that the RAID controller cannot correctly reconstruct, in replacement memory units, data recorded in the failed memory units.

In contrast, the data storage apparatus according to the present embodiment comprises the error correction encoder 16 and the error correction decoder 17. By means of the error correction decoder 17, error correction can be further performed on encoded data stream restored by the RAID controller 12. Namely, even when a memory chip failure occurs in a plurality of memory units, and the RAID controller 12 cannot correctly restore a data block, an error can be corrected by the error correction decoder 17. Data of which error has been corrected by the error correction decoder 17 is encoded by the error correction encoder 16, and written to the replacement memory unit, thereby reconstructing data. Accordingly, even when a memory chip failure occurs in a plurality of memory units, data recorded in the failed memory units can be correctly reconstructed.

Consequently, the data storage apparatus according to the present embodiment can substantially improve reliability in recording, reproduction and reconstruction of image data.

In the first embodiment, the error detector 13-1 adds an error correction code to a data block or parity data block output from the RAID controller 12 for each page. The error detector 13-1 determines occurrence of an error in the data block or parity block output from the memory unit 14-1 for each page based on the error detection code. Therefore, a memory chip failure can be detected for each page, which is a writable unit of the memory chip.

Further, in the data storage apparatus according to the present embodiment, presence/absence of a failure can be determined for each writable unit of the memory chip. Therefore, when one memory chip fails, the data storage apparatus does not determine that the entire memory unit has failed. Namely, even when one memory chip of the memory unit fails, the memory unit can be used continuously.

Second Embodiment

Figure 6:
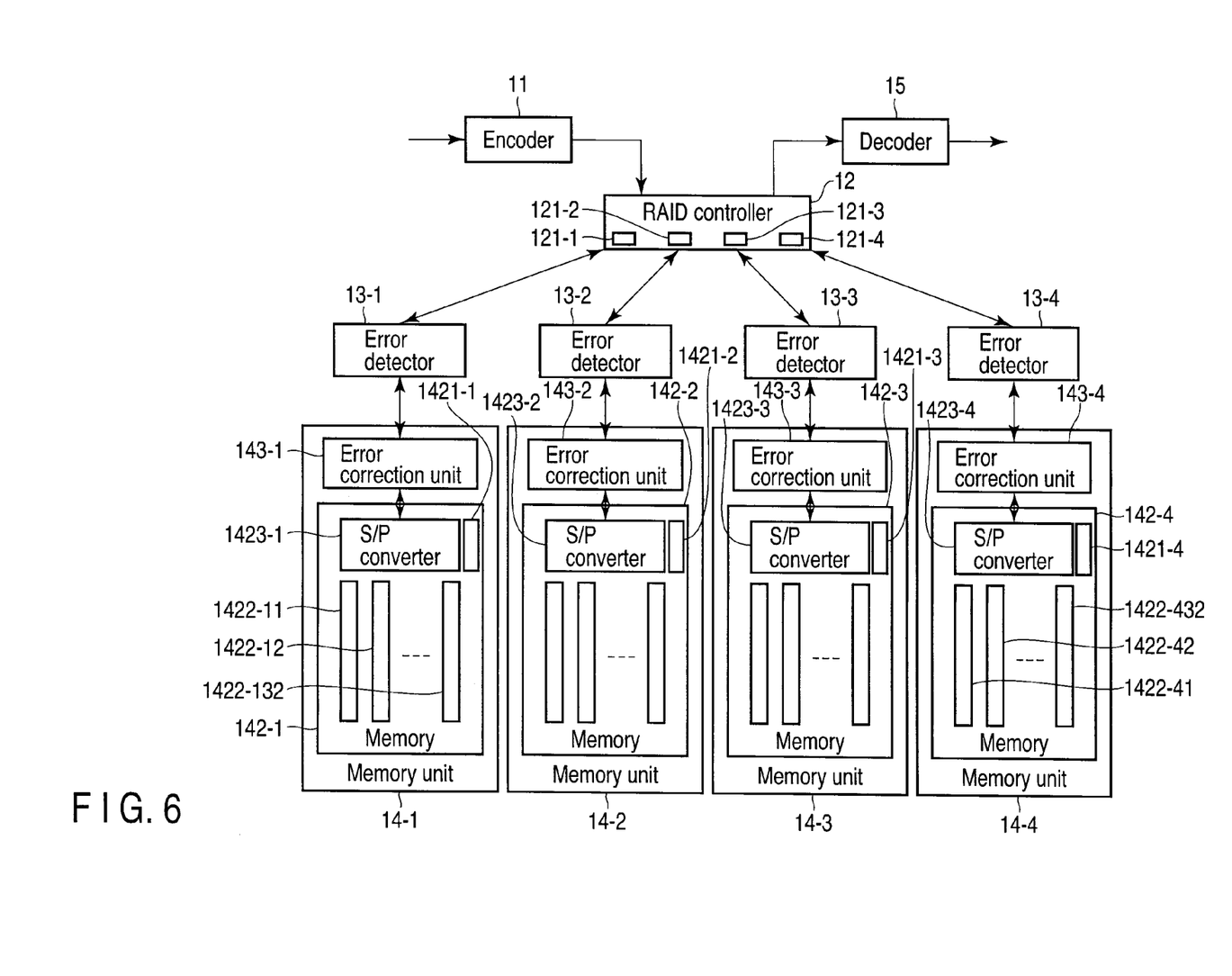
FIG. 6 is a block diagram showing a functional configuration of a data storage apparatus according to a second embodiment.

FIG. 6 is a block diagram showing a functional configuration of a data storage apparatus according to a second embodiment. The data storage apparatus in FIG. 6 comprises an encoder 11, a Redundant Arrays of Independent Disks (RAID) controller 12, error detectors 13-1 to 13-4, memory units 14-1 to 14-4, and a decoder 15. The data storage apparatus has a configuration according to RAID 5.

The RAID controller 12 is connected to the encoder 11 and the decoder 15. The RAID controller 12 comprises connection interfaces 121-1 to 121-4. The RAID controller 12 is connected to the error detectors 13-1 to 13-4 by the connection interfaces 121-1 to 121-4. The error detectors 13-1 to 13-4 are connected to the memory units 14-1 to 14-4.

The encoder 11 acquires an image data stream from, for example, a camera, and encodes the image data stream by a predetermined encoding method. The encoder 11 outputs an encoded data stream to the RAID controller 12.

When image data is recorded, the RAID controller 12 divides the encoded data stream output from the encoder 11 into units of a writable page, thereby generating three data blocks. The RAID controller 12 generates a parity data block corresponding to one writable page. The capacity of one page, which is a writable unit, is determined depending on the memory chips. The parity data block is generated so that the three data blocks and the parity data block have no "1" or even-numbered "1" in total. The RAID controller 12 distributes the data blocks to three of the connection interfaces 121-1 to 121-4, and outputs the parity data block to the remaining one of the connection interfaces 121-1 to 121-4. The RAID controller 12 sequentially switches the connection interface to which parity data block is output, allowing the other connection interfaces to receive the data blocks.

When image data is reproduced, the RAID controller 12 receives data blocks and a parity data block from the error detectors 13-1 to 13-4 via the connection interfaces 121-1 to 121-4. When an error occurs in one of the data blocks, the RAID controller 12 restores the data block including an error based on the normal data blocks and the parity data block. The RAID controller 12 synthesizes the restored data block and the normal data blocks to generate an encoded data stream, and outputs it to the decoder 15. On the other hand, when no error occurs, the RAID controller 12 synthesizes the data blocks output from three of the error detectors 13-1 to 13-4 to generate an encoded data stream. The RAID controller 12 outputs the encoded data stream to the decoder 15.

The decoder 15 decodes the encoded data stream output from the RAID controller 12 by a decoding method according to the encoding method of the encoder 11 to generate an image data stream. The decoder 15 outputs the image data stream to the outside.

When image data is recorded, the error detector 13-1 adds an error detection code, such as a checksum, to a data block or parity data block output from the RAID controller 12 for each page. The error detector 13-1 outputs the data block or parity data block to which the error detection code has been added to the memory unit 14-1.

When image data is reproduced, the error detector 13-1 receives a data block or parity data block from the memory unit 14-1. The error detector 13-1 determines whether the data block or parity data block output from the memory unit 14-1 includes an error based on the error detection code. When the error detector 13-1 detects an error in the data block or parity data block, the error detector 13-1 outputs a detection signal to the RAID controller 12. The processing in error detectors 13-2 to 13-4 is the same as that of error detector 13-1.

The memory units 14-1 to 14-4 respectively comprise error correction units 143-1 to 143-4 and memories 142-1 to 142-4. The memories 142-1 to 142-4 respectively comprise: memory controllers 1421-1 to 1421-4; memory chips 1422-11 to 1422-132, . . . , 1422-41 to 1422-432, each of which comprises semiconductor memories, such as a flush memory; and serial-to-parallel converters 1423-1 to 1423-4. In the present embodiment, 32 memory chips are used. However, the number of memory chips is not limited to 32.

When image data is recorded, the memory units 14-1 to 14-4 store the data blocks and parity data block output from the error detectors 13-1 to 13-4. The same processing is performed in the memory units 14-1 to 14-4, and processing in memory unit 14-1 will be representatively described below.

The error correction unit 143-1 encodes the data block or parity data block output from the error detector 13-1 by means of an error correction code capable of correcting a burst error. For example, a Reed-Solomon correction code is used as the error correction code capable of correcting a burst error. The error correction unit 143-1 adds a Reed-Solomon correction code so that the total code length of the data block or parity data block and the Reed-Solomon correction code corresponds to N times the number of parallel memory chips, where N is a natural number. For example, since 32 memory chips are used in the present embodiment, the error correction unit 143-1 adds a two-byte error correction code to each 30-byte data block or parity data block. The error correction unit 143-1 outputs a data block or parity data block to which the error correction code has been added to the memory 142-1.

In the memory 142-1, when the memory controller 1421-1 receives the data block or parity data block output from the error correction unit 143-1, the memory controller 1421-1 performs writing control on the memory chips 1422-11 to 1422-132.

The serial-to-parallel (S/P) converter 1423-1 divides the data block or parity data block output from the error correction unit 143-1 into one-byte data items, and outputs the data items to the memory chips 1422-11 to 1422-132 in parallel. The memory chips 1422-11 to 1422-132 write the data items output from the S/P converter 1423-1 to the semiconductor memories.

When image data is reproduced, the memory units 14-1 to 14-4 read the recorded data blocks and the recorded parity data block, and output them to the error detectors 13-1 to 13-4. The same processing is performed in the memory units 14-1 to 14-4, and processing in memory unit 14-1 will be representatively described below.

The memory controller 1421-1 read data items recorded in the memory chips 1422-11 to 1422-132.

The S/P converter 1423-1 synthesizes the data items read from the memory chips 1422-11 to 1422-132 to generate a data block or parity data block. The S/P converter 1423-1 outputs the data block or parity data block to the error correction unit 143-1.

The error correction unit 143-1 corrects a burst error in the data block or parity data block output from the memory 142-1 by means of an error correction code. The error correction unit 143-1 outputs the data block or parity data block of which burst error has been corrected to the error detector 13-1.

Next, operations of the data storage apparatus with the above configuration will be described.

Figure 7:
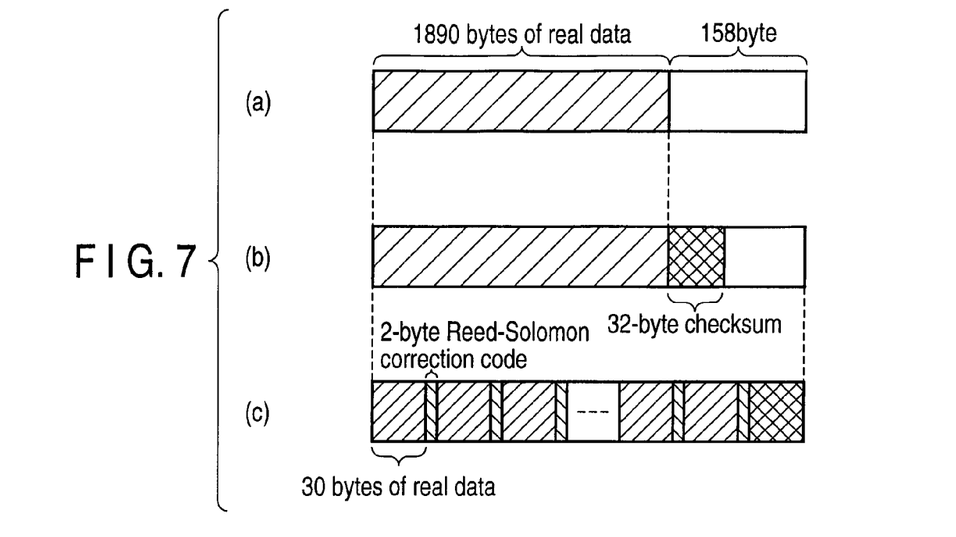
FIG. 7 shows processing performed on data blocks and a parity data block in the data storage apparatus of FIG. 6.

FIG. 7 is a schematic diagram showing processing performed on a data block or a parity data block in the data storage apparatus according to the second embodiment. In the present embodiment, the capacity of one page is 2048 bytes, but the capacity of one page of this embodiment is not limited to 2048 bytes.

When image data is recorded, the RAID controller 12 divides an encoded data stream output from the encoder 11 into units of 5670 bytes, and divides each unit into three data blocks comprising 1890 bytes as shown in FIG. 7 (a). The data block is 158 bytes less than the capacity of one page, i.e., 2048 bytes. The RAID controller 12 outputs the data block shown in FIG. 7 (a) to each of three error detectors of the error detectors 13-1 to 13-4.

The RAID controller 12 generates a 1890-byte parity data block as shown in FIG. 7 (a) for the encoded data stream output from the encoder 11. The RAID controller 12 outputs the parity data block shown in FIG. 7 (a) to one error detector of the error detectors 13-1 to 13-4.

When image data is reproduced, the RAID controller 12 receives the data block shown in FIG. 7 (a) from each of three error detectors of the error detectors 13-1 to 13-4. The RAID controller 12 also receives the parity data block shown in FIG. 7 (a) from one error detector of the error detectors 13-1 to 13-4.

When the RAID controller 12 receives a detection signal from one of the error detectors 13-1 to 13-4, the RAID controller 12 determines that an error has occurred in the data block or the parity data block supplied from the error detector which has generated the detection signal. If the RAID controller 12 determines that one of the data blocks includes the error, the RAID controller 12 restores the data block including the error based on the other data blocks and the parity data block. The RAID controller 12 synthesizes the restored data block and the other data blocks to generate an encoded data stream. If no data block includes an error, the RAID controller 12 synthesizes the data blocks from three of the error detectors 13-1 to 13-4 to generate an encoded data stream. The RAID controller 12 outputs the encoded data stream to the decoder 15.

When image data is recorded, the error detector 13-1 adds a 32-byte checksum to the data block or parity data block output from the RAID controller 12 as shown in FIG. 7 (b). The error detector 13-1 outputs the data block or parity data block shown in FIG. 7 (b) to the memory unit 14-1.

When image data is reproduced, the error detector 13-1 receives the data block or parity data block shown in FIG. 7 (b) from the memory unit 14-1. The error detector 13-1 refers to the checksum, and determines whether or not an error has occurred in the data block or parity data block. If the error detector 13-1 determines that an error has occurred in the data block or parity data block, the error detector 13-1 generates a detection signal and outputs it to the RAID controller 12. The error detector 13-1 outputs the data block or parity data block shown in FIG. 7 (a) to the RAID controller 12.

When image data is recorded, the error correction unit 143-1 adds a two-byte Reed-Solomon correction code to the data block or parity data block output from the error detector 13-1 for each 30 bytes of real data, as shown in FIG. 7 (c). Accordingly, the one-page capacity of 2048 bytes is fully occupied. The error correction unit 143-1 outputs the data block or parity data block shown in FIG. 7 (c) to the memory 142-1.

When image data is reproduced, the error correction unit 143-1 receives the data block or parity data block shown in FIG. 7 (c) from the memory 142-1. The error correction unit 143-1 corrects a burst error in the 30 bytes of real data by means of the two-byte Reed-Solomon correction code. The error correction unit 143-1 outputs the data block or parity data block shown in FIG. 7 (b) to the error detector 13-1.

Figure 8:
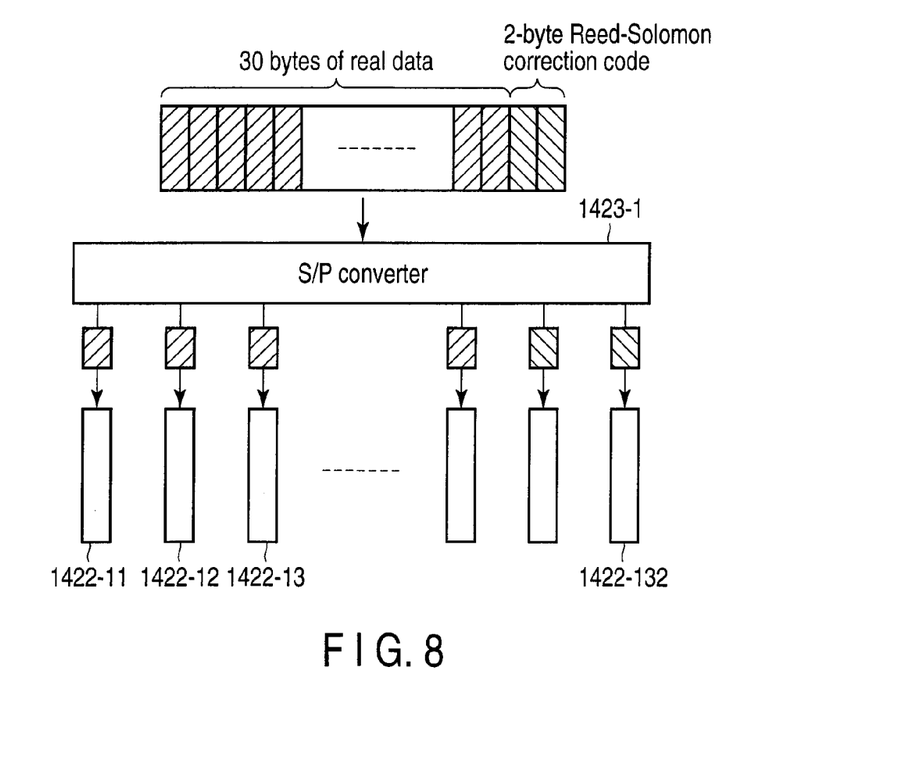
FIG. 8 shows parallelization processing of an S/P converter shown in FIG. 6.

FIG. 8 is a schematic view showing parallelization processing of the S/P converter 1423-1 in the data storage apparatus according to the second embodiment.

The S/P converter 1423-1 receives the data block or parity data block shown in FIG. 7 (c) from the error correction unit 143-1. Whenever the S/P converter 1423-1 receives the 30 bytes of real data and the two-byte Reed-Solomon correction code from the error correction unit 143-1, the S/P converter 1423-1 divides the data into one-byte data items, and outputs them to the memory chips 1422-11 to 1422-132 in parallel. Accordingly, 30 one-byte real data items and two one-byte Reed-Solomon correction codes are output to the memory chips 1422-11 to 1422-132, respectively.

Figure 9:
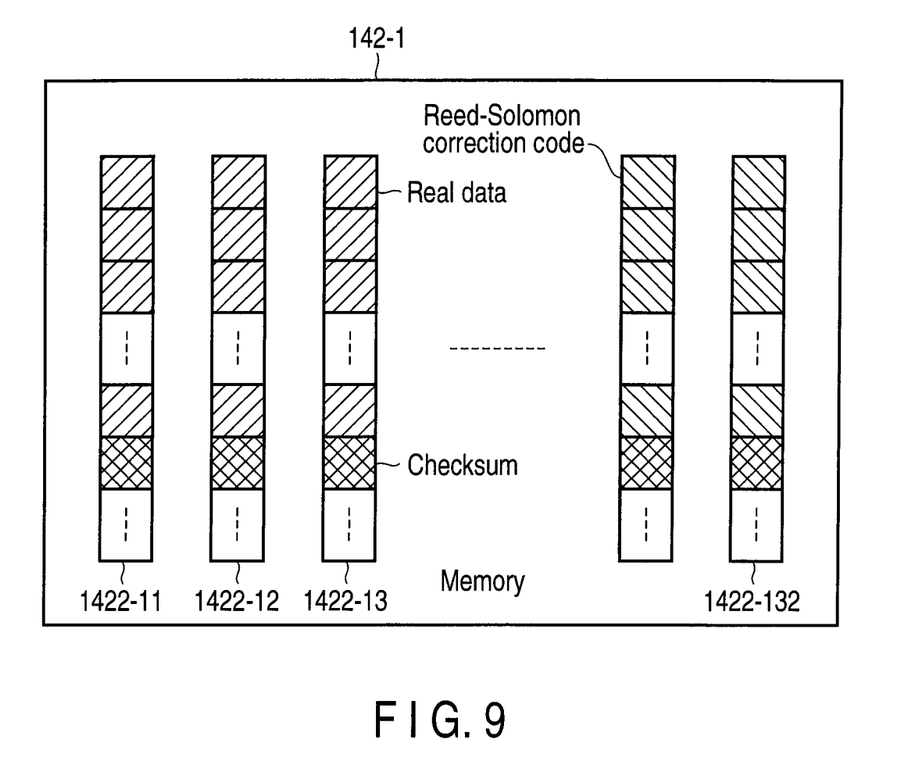
FIG. 9 shows an example of storage of a data block or parity data block in a memory shown in FIG. 6.

FIG. 9 is a schematic view showing an example of storage of the data block or parity data block in the memory chips 1422-11 to 1422-132 in the data storage apparatus according to the second embodiment.

The memory chips 1422-11 to 1422-132 write the data items output from the S/P converter 1423-1 to the semiconductor memories. Accordingly, the memory chips 1422-11 to 1422-132 store the data block or parity data block shown in FIG. 7 (c), as shown in FIG. 9. Namely, the real data items and checksums are stored in memory chips 1422-11 to 1422-130, and the Reed-Solomon correction codes and checksums are stored in memory chips 1422-131 and 1422-132.

Figure 10:
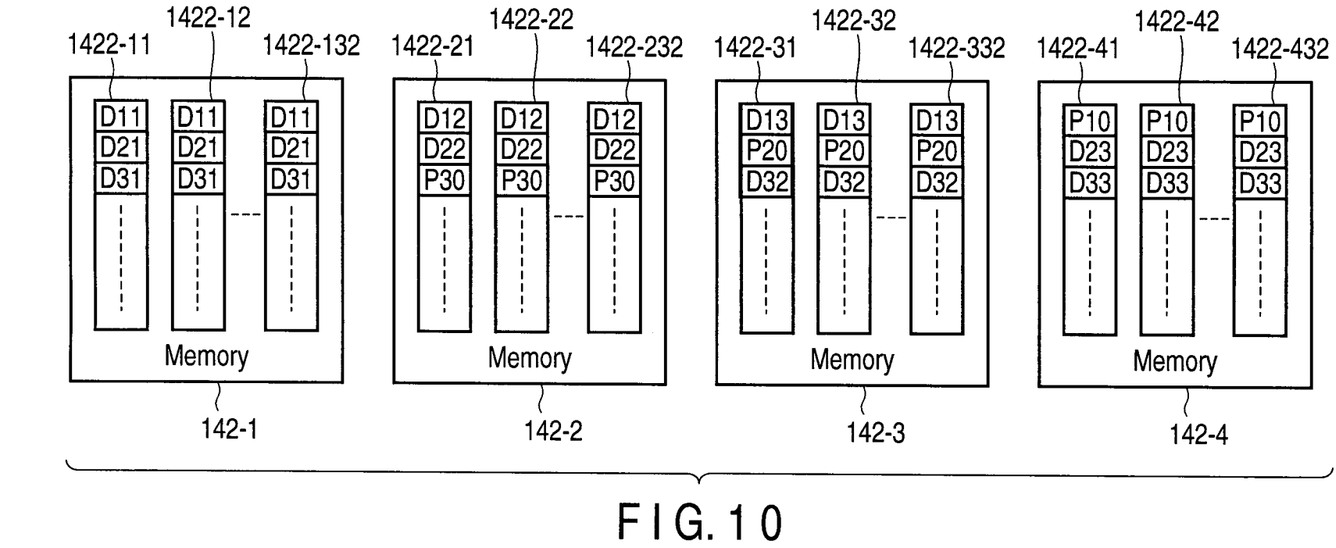
FIG. 10 shows an example of storage of the data block and parity data block in the memories shown in FIG. 6.

FIG. 10 shows a schematic view of the data block and parity data block recorded in the memories 142-1 to 142-4 by the above-mentioned writing processing. In FIG. 10, D11, D12, D13, . . . represent data items generated by dividing a data block by S/P converters 1423-1, 1423-4, and P10, P20, P30, . . . represent data items generated by dividing a parity data block by S/P converters 1423-1 and 1423-4. The data items are written to the memory chips 1422-11 to 1422-132, . . . , 1422-41 to 1422-432 in parallel. The memory unit in which the parity data block is recorded is switched by the RAID controller 12 for each page.

Figure 11:
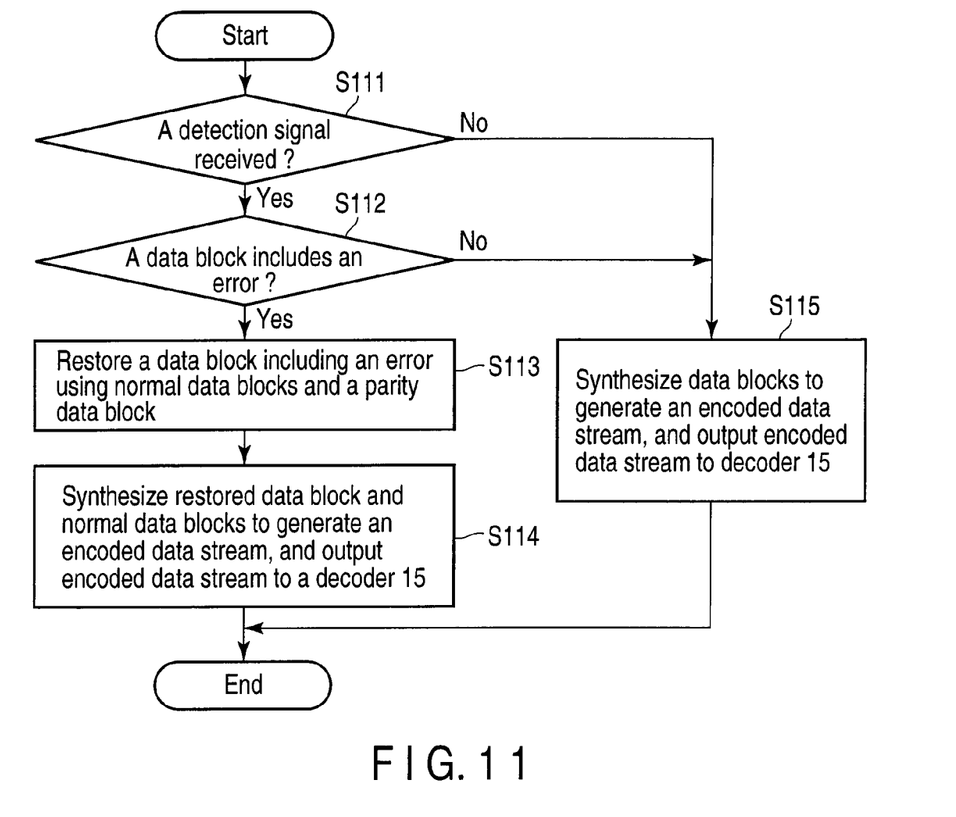
FIG. 11 is a flowchart showing how a RAID controller shown in FIG. 6 restores data.

FIG. 11 is a flowchart of how the RRID controller 12 restores data in the data storage apparatus according to the second embodiment.

The RAID controller 12 determines whether a detection signal has been transmitted from any error detector of the error detectors 13-1 to 13-4 (step S111). If the RAID controller 12 receives a detection signal (Yes in step S111), the RAID controller 12 determines that the data block or parity data block output from an error detector which has transmitted the detection signal includes an error. The RAID controller 12 determines whether or not a data block includes the error (step S112). When a data block includes the error (Yes in step S112), the RAID controller 12 restores the data block including the error based on normal two data blocks and a parity data block (step S113). The RAID controller 12 synthesizes the restored data block and the normal two data blocks to generate an encoded data stream, and outputs the encoded data stream to the decoder 15 (step S114).

When the detection signal is not received in step S111 (No in step S111), the RAID controller 12 synthesizes three data blocks to generate an encoded data stream, and outputs the encoded data stream to the decoder 15 (step S115).

When the RAID controller 12 determines that no data block includes an error in step S112 (No in step S112), the RAID controller 12 moves the processing to step S115.

As described above, in the second embodiment, when image data is recorded, the data storage apparatus adds an error correction code so that the total code length of the real data and error correction code is N times the number of parallel memory chips. The S/P converter 1423-1 outputs one-byte data items output from the error correction unit 143-1 to the memory chips in parallel. Accordingly, each of the memory chips connected in parallel store either the real data item or Reed-Solomon correction code.

When image data is reproduced, the data storage apparatus reads data items from the memory chips in parallel, and converts the read data items into serial data at the S/P converter 1423-1. When a data block or parity data block output from the S/P converter 1423-1 includes a burst error, the error correction unit 143-1 corrects the burst error based on the Reed-Solomon correction code. If data items read from the memory chips connected in parallel include an error, the error can be corrected based on the Reed-Solomon correction code. Consequently, even if one of the memory chips connected in parallel fails, a data error caused by the failure can be corrected.

In the second embodiment, image data is recorded, the error detector 13-1 adds a 32-byte error detection code to the data block or parity data block output from the RAID controller 12 for each page. The 32-byte error correction code is parallel-converted into units of one byte by the S/P converter 1423-1, and the one-byte units are respectively written to the memory chips connected in parallel. When image data is reproduced, the error detector 13-1 determines occurrence of an error in a data block or parity data block output from the memory unit 14-1 based on the error detection code added to the data block or parity data block. Namely, the error detector 13-1 determines occurrence of an error based on the error detection code written to each memory chip. Accordingly, failure can be detected for each memory chip.

In the second embodiment, when the error detector 13-1 detects an error in a data block, the RAID controller 12 restores the data block including an error based on normal data blocks and a parity data block. Accordingly, when a memory chip fails, data recorded in that memory chip can be restored.

Since the data storage apparatus of the present embodiment can compensate for failure of each memory chip, image data can be correctly reproduced even when a memory chip fails.

As the second embodiment, an exemplary case in which 32 memory chips are used has been explained. However, the number of memory chips of the second embodiment is not limited to 32. For example, even when 64 memory chips are used, the second embodiment may be implemented. In that case, however, the error detector 13-1 adds a 64-byte checksum to a data block or parity data block, and the error correction unit 143-1 adds a two-byte Reed-Solomon correction code to each 62-byte real data item. The S/P converter 1423-1 outputs the data block or parity data block output from the error correction unit 143-1 to the 64 memory chips in parallel. Consequently, the ratio of the Reed-Solomon correction code to the real data decreases in comparison to the case where 32 memory chips are used, and a burst error can be more efficiently corrected.

Other Embodiments

The data storage apparatus of each of the above-described embodiments adopts RAID 5. However, the RAID level is not limited to RAID 5, and any RAID which generates a parity data block may be used. For example, the above-described embodiments can be implemented even when, for example, RAID 3 or RAID 4 is adopted.

In the above-described embodiments, image data is encoded by the encoder 11 and output to the RAID controller 12, and an encoded data stream output from the error correction decoder 17 or the RAID controller 12 is decoded by the decoder 15. However, another configuration may be adopted. The configuration in which an encoded data stream is externally acquired by the error correction encoder 16 or the RAID controller 12, and an encoded data stream output from the error correction decoder 17 or the RAID controller 12 is output to the outside may be adopted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus comprising memory chips which enable data write in units of one page, each of the memory chips comprising a semiconductor memory, the data storage apparatus comprising:
an error correction encoder configured to add an error correction code to an encoded data stream;
a RAID (Redundant Arrays of Independent Disks) controller comprising a plurality of connection interfaces and configured to: divide the encoded data stream output from the error correction encoder into data blocks, each of which corresponds to the page; generate a parity data block based on the data blocks; and output the data blocks and parity data block to the connection interfaces, respectively;

a plurality of error detectors connected to the connection interfaces, respectively, and configured to add an error detection code to the data blocks and parity data block output from the connection interfaces;

a plurality of memory units connected to the error detectors, respectively, each of the memory units comprising the memory chips, and the memory units being configured to write the data blocks and parity data block output from the error detectors to the memory chips in units of the page.

2. The data storage apparatus of claim 1, wherein the memory units read the data blocks and parity data block written to the memory chips;

the error detectors output the data blocks and parity data block read by the memory units to the RAID controller, determine whether the data blocks and parity data block include an error based on the error detection code, and output a detection signal to the RAID controller when the data blocks and parity data block include an error, when the RAID controller receives a detection signal, the RAID controller restores a data block output from an error detector which has output the detection signal based on other data blocks and the parity data block, and synthesizes a restored data block and said other data blocks to generate an encoded data stream, when the RAID controller does not receive a detection signal, the RAID controller synthesizes the data blocks to generate an encoded data stream, and the data storage apparatus further comprises an error correction decoder configured to correct an error in the encoded data stream output from the RAID controller based on the error correction code.

3. The data storage apparatus of claim 1, wherein the memory units further comprise bit error correction units configured to add a bit error correction code to the data blocks and parity data block output from the error detectors.

4. The data storage apparatus of claim 2, wherein the memory units further comprise bit error correction units configured to add a bit error correction code to the data blocks and parity data block output from the error detectors, and correct a bit error in the data blocks and parity data block read from the memory chips based on the bit error correction code.

5. A method of writing data on and reading from a data storage apparatus comprising memory chips on which the data is written in units of one page, the method comprising:

adding, by an error correction encoder, an error correction code to an encoded data stream;

dividing, by RAID (Redundant Arrays of Independent Disks) controller, the encoded data stream to which the error correction code has been added into data blocks, each of which corresponds to the page;

generating, by the RAID controller, a parity data block based on the data blocks;

adding, by error detectors, an error detection code to the data blocks and parity data block;

writing, by memory units comprising the memory chips, the data blocks and parity data block to which the error detection code has been added to the memory chips in units of the page.

6. The method of claim 5, the method comprising:

reading, by the memory units, the data blocks and parity data block written to the memory chips;

determining, by the error detectors, whether the data blocks and parity data block include an error based on the error detection code;

when a data block includes an error, restoring the data block based on other data blocks and the parity data block, and synthesizing a restored data block and said other data blocks to generate an encoded data stream by the RAID controller;

when the data blocks do not include an error, synthesizing the data blocks to generate an encoded data stream by the RAID controller; and correcting, by an error correction decoder, an error in the generated encoded data stream based on the error correction code.

7. A data storage apparatus comprising memory chips, each of which comprises a semiconductor memory, the data storage apparatus comprising:

a RAID (Redundant Arrays of Independent Disks) controller comprising a plurality of connection interfaces and configured to divide an encoded data stream into data blocks, generate a parity data block based on the data blocks, and output the data blocks and parity data block to the connection interfaces, respectively;

a plurality of error detectors connected to the connection interfaces, respectively, and configured to add an error detection code to the data blocks and parity data block output from the connection interfaces;

a plurality of memory units respectively connected to the error detectors and comprising: error correction units configured to add an error correction code to the data blocks and parity data block output from the error detectors; and serial-to-parallel converters configured to divide the data blocks and parity data block to which the error correction code has been added into data items of a predetermined capacity, each of the memory units comprising a plurality of memory chips configured to store the data items in parallel.

8. The data storage apparatus of claim 7, wherein the memory units read the data items recoded in the memory chips in parallel, synthesize the data items to generate the data block and parity data block by means of the serial-to-parallel converters, and correct an error in the data blocks and parity data block, by the error correction unit based on the error correction code;

the error detectors output the data blocks and parity data block output from the memory units to the RAID controller, determine whether the data blocks and parity data block include an error based on the error detection code, and output a detection signal to the RAID controller when the data blocks and parity data block include an error;

when the RAID controller receives a detection signal, the RAID controller restores a data block output from an error detector which has output the detection signal based on other data blocks and the parity data block, and synthesizes a restored data block and other data blocks to generate an encoded data stream; and when the RAID controller does not receive a detection signal, the RAID controller synthesizes the data blocks to generate an encoded data stream.

9. The data storage apparatus of claim 7, wherein the error correction units add the error correction code to the data blocks and parity data block from the error detectors so that a total code length of the error correction code and each of the data blocks and parity data block is an integer multiple of the number of parallel memory chips.

10. The data storage apparatus of claim 7, wherein the error correction units add an M-byte error correction code so that a total code length of the error correction code and each of the data blocks and parity data block output from the error detectors corresponds to the number N of parallel memory chips whenever a data block or parity data block of (N–M) bytes is received.

11. The data storage apparatus of claim 7, wherein the error correction code added by the error detectors comprises bytes equal in number to parallel memory chips of the memory chips to the data blocks and parity data block output from the connection interfaces.

12. A method of writing data on and reading from a data storage apparatus comprising memory chips, the method comprising:
- dividing, by a RAID (Redundant Arrays of Independent Disks) controller, an encoded data stream into data blocks;
- generating, by the RAID controller, a parity data block based on the data blocks;
- adding, by error detectors, an error detection code to the data blocks and parity data block;
- adding, by memory units, an error correction code to the data blocks and parity data block to which the error detection code has been added;
- dividing, by the memory units, the data blocks and parity data block to which the error correction code has been added into data items of a predetermined capacity; and
- storing, by the memory units, the data items in the memory chips in parallel.

13. The method of claim 12, the method comprising:
- reading, by the memory units, the data items stored in the memory chips in parallel;
- synthesizing, by the memory units, the read data items to generate the data blocks and parity data block,
- correcting, by the memory units, an error in the data blocks and parity data block based on the error correction code;
- determining, by the error detectors, whether the data blocks and parity data block subjected to error correction include an error based on the error detection code;
- when a data block subjected to error correction includes an error, restoring the data block including the error based on other data blocks and the parity data block, and synthesizing a restored data block and said other data blocks to generate an encoded data stream by the RAID controller; and
- when the data blocks subjected to error correction do not include an error, synthesizing the data blocks subjected to error correction to generate an encoded data stream by the RAID controller.

* * * * *